June 8, 1926.                                                          1,587,539
E. MAYER
DEVICE FOR OPTICALLY MEASURING LIGHT, PHOTOMETER
Filed August 27, 1923
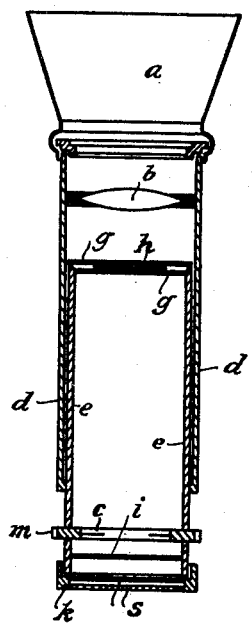
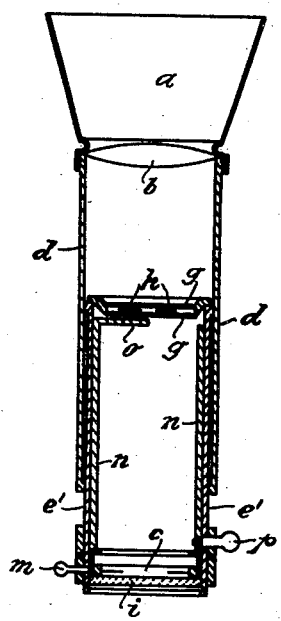
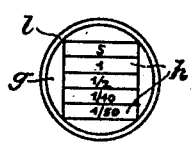
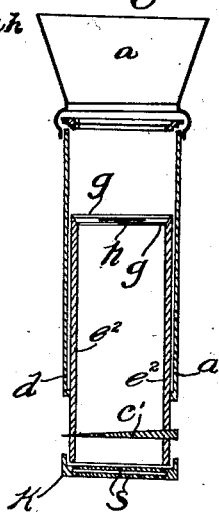
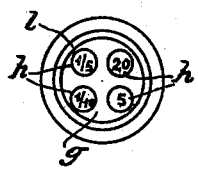
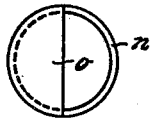

Patented June 8, 1926.

1,587,539

UNITED STATES PATENT OFFICE.

EMIL MAYER, OF VIENNA, AUSTRIA.

DEVICE FOR OPTICALLY MEASURING LIGHT, PHOTOMETER. REISSUED

Application filed August 27, 1923, Serial No. 659,456, and in Austria April 28, 1923.

My invention relates to a new and improved exposure meter.

One of the objects of my invention is to provide an exposure meter which will enable the user to readily and directly determine the exposure time and in addition the corresponding diaphragm setting, for a camera provided with a lens and also for enlarging or reproducing appliances embodying lenses, so that proper negatives or positives can be secured.

Another object of my invention is to provide an exposure meter which can be operated directly for the above mentioned purposes, by means of light which is transmitted, refracted, reflected or is radiated from or emanates in any manner from the object to be photographed or reproduced.

Other objects of my invention will be set forth in the following description and drawings which illustrate a preferred embodiment thereof, it being understood that the above general statement of the objects of my invention is intended merely to generally explain the same.

Fig. 1 is a vertical section of one embodiment of my device, the upper part being shown in elevation.

Fig. 2 is a diagrammatic plan view showing the arrangement of the transmitting sections.

Fig. 3 is a view similar to Fig. 1 and shows a modification of my invention.

Fig. 4 is a view similar to Fig. 2 and it shows the transmitting sections used in the second embodiment.

Fig. 5 is a detail view of the second embodiment.

Fig. 6 illustrates a third embodiment.

In the construction shown in Fig. 1, a number of light comparing sections $h$ of gradually varying translucency are provided.

As shown in Fig. 2, these comparing sections may be arranged side by side, although my invention is not limited to any particular arrangement of the said comparing sections. Each of these sections has an identifying mark such as a numeral formed thereon and a light contrast is provided between each section and its identifying numeral, so that the identifying numeral is visible when the proper amount of light is passed through the respective section.

For example, each of the comparing sections may be translucent and the identifying numerals may then be given a black or other contrasting color. If the comparing sections have one of their faces given a black color then the identifying numerals can be rendered visible by simply omitting the black coloration at the part of each said section corresponding to the outline of the identifying numeral.

These comparing sections are held in position between two transparent panes $g$ made of glass or any other suitable material which is permeable to light. Of course, the comparing sections can be directly formed upon a sheet of glass of varying thickness so as to provide the requisite difference in light permeability. The comparing sections are mounted at the top of a tube $e$ which is provided with an ordinary iris diaphragm $c$. This diaphragm $c$ is actuated by a ring $m$ which can be manipulated on the outside of the tube so as to open or close the diaphragm.

I have not shown the details of construction of the iris diaphragm $c$ as this in itself is a well known piece of apparatus.

An indicator can be provided upon the ring $m$ to co-operate with any ordinary and well known scale, so that the extent to which the diaphragm is opened can be readily determined.

A sheet of ground glass or other material $i$ is located in front of the diaphragm $c$ so that the formation of an image within the apparatus is prevented when a diaphragm opening is very narrow. The tube $e$ on which the comparing sections, the iris diaphragm and the outer sheet $i$ are mounted, is slidably mounted within an outer tube $d$ provided with an ordinary magnifying lens $b$. The usual flaring end $a$ is provided so as to protect the eye of the observer from external light.

In the embodiment shown in Fig. 1, a removable cover $k$ is provided for the end of the inner tube $e$ and this tube contains two sheets $s$ made of glass or other transparent material between which members of varying light permeability can be located. This is for the purpose of subduing very bright light.

In the embodiment shown in Figs. 3, 4 and 5, an inner tube $n$ is located within the tube $e'$. Any desired portion of the inner end of the inner tube $n$ can be covered by an inner opaque covering member $o$, which in this embodiment is shown as semi-circular, so that it covers half the aperture of the said inner tube n. The tube n can be turned by means of a handle p which passes through a slot in the tube e'. In this embodiment there are four comparing sections h which are arranged as shown in Fig. 4, and as the inner tube n is turned by means of the handle p, the observer can exclude from the field of vision any of the sections h.

In the embodiment shown in Fig. 6 the magnifying lens is omitted and a tube d of any suitable length is provided in which another tube e² is slidably mounted. The light comparing sections can be provided by means of a translucent wedge c' provided with identifying numerals for adjacent zones thereof. These adjacent zones are of different light permeability due to the difference in thickness of the wedge at various portions thereof.

In the embodiment shown in Fig. 6, any well known means equivalent to an iris diaphragm for regulating the size of the aperture through which the light is admitted can be utilized.

The method of using this apparatus is as follows:—

In the embodiment shown in Figs. 3–5, for example, the comparing section or field identified by the numeral 1/10 is the least permeable to light. Hence, this numeral 1/10, for example, can only be observed when the light passing through this section corresponds to sunlight or the like. If such light conditions are not present, then the numeral 1/10 cannot be seen by the observer. The section or field identified by the numeral 1/5 is somewhat more light permeable from the first mentioned section, so that the numeral 1/5 can be seen by the observer when sunlight is not available. Similarly, the numeral 5 identifies a section which is more light permeable than the second mentioned field, and the field identified by the numeral 20 has a still greater light permeability.

The same relationship exists in the embodiment shown in Figs. 1 and 2.

In the embodiment shown in Figs. 3–5, for example, when the diaphragm is opened to its fullest extent, the light emanating from the object to be photographed, or emanating from the picture or image which is to be reproduced, is perceptible because said light renders one of the sections visible. The observer will see only the numerals on those sections which are sufficiently illuminated by the said light, whose intensity varies according to the conditions present. For example, if the amount of light transmitted is such that the observer can see the numeral 1/5, he will not be able to see the numeral 1/10, and he will be able to see the numerals 5 and 20. The numeral 1/5, namely the numeral corresponding to the field having the greatest light permeability, will identify to the observer the light conditions which are present.

The iris diaphragm is then closed to its greatest extent and is then opened until the observer can just see the identifying numeral which corresponds to the light conditions present. The aperture of the iris diaphragm which can be readily indicated by means of a suitable scale, for example, and the identifying numeral which indicates directly to the observer the light conditions which are present, enable him to immediately determine the amount of light which is necessary for securing the corresponding negative or positive.

For example, the identifying numeral for the field of greatest light permeability can correspond to the time of exposure and the diaphragm setting can correspond to the diaphragm setting on the camera or other optical apparatus which is being used. The user can secure the proper combination of exposure time and diaphragm setting, which regulates the amount of light acting upon the sensitive plate, by either adjusting the shutter opening or the diaphragm setting for the lens which is being used. In many cases the diaphragm setting can be immediately adjusted with respect to the shutter opening or aperture so that the sensitive plate is acted upon by the proper amount of light so as to clearly reproduce all the objects within the field of the lens, including those objects which are near the lens and those which are far away from the lens.

I have described a preferred embodiment of my invention, but it is clear that numerous changes and omissions could be made without departing from its spirit.

I claim:—

1. In an exposure meter, the combination of a plurality of fields of varying light permeability, each of said fields having an identifying mark thereon, adjustable means for regulating the aperture through which light passes to the said fields, and manually operated means for excluding selected fields from the line of vision of the observer.

2. A device according to claim 1 in which the said adjustable means consists of an iris diaphragm.

3. In an exposure meter, the combination of a plurality of fields of varying light permeability, the said fields having opaque faces and contrasting light permeable identifying marks formed thereon, means for controlling the aperture through which light can be caused to pass through the said fields, and manually operated means for excluding selected fields from the line of vision of the observer.

4. In an exposure meter, the combination of a plurality of fields of varying light permeability and having identifying marks formed thereon, manually operated means for excluding selected fields from the line of vision of the observer, and additionally manually controlled means for regulating the aperture through which light passes to the said fields.

5. In an exposure meter, the combination of a plurality of fields of varying light permeability, each of said fields having an identifying mark thereon, an iris diaphragm associated with the said fields and adapted to control the size of the aperture through which light can pass through the said fields, a sheet of translucent material associated with the said diaphragm and adapted to prevent the formation of an image in the device when the diaphragm opening is small, and manually operated means for excluding selected fields from the line of vision of the observer.

In testimony whereof I have signed my name to this specification.

Dr. EMIL MAYER.